United States Patent
DeLuca et al.

(10) Patent No.: US 12,095,944 B2
(45) Date of Patent: *Sep. 17, 2024

(54) NON-VERBAL SENSITIVE DATA AUTHENTICATION

(71) Applicant: International Business Machines Corporation, Armonk, NY (US)

(72) Inventors: Lisa Seacat DeLuca, Bozeman, MT (US); Jeremy A. Greenberger, San Jose, CA (US); David M. Ogle, Powell, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,077

(22) Filed: Oct. 6, 2023

(65) Prior Publication Data
US 2024/0031476 A1    Jan. 25, 2024

Related U.S. Application Data

(63) Continuation of application No. 17/170,966, filed on Feb. 9, 2021, now Pat. No. 11,818,282, which is a
(Continued)

(51) Int. Cl.
*H04M 3/22* (2006.01)
*H04L 9/40* (2022.01)
(Continued)

(52) U.S. Cl.
CPC ...... *H04M 3/2281* (2013.01); *H04L 63/0853* (2013.01); *H04M 3/5183* (2013.01);
(Continued)

(58) Field of Classification Search
CPC ............ H04M 3/2281; H04M 3/5183; H04M 2203/256; H04M 2203/6009;
(Continued)

(56) References Cited

U.S. PATENT DOCUMENTS 5,892,470 A    4/1999    Kusnick
6,101,397 A    8/2000    Grob
(Continued)

OTHER PUBLICATIONS

Disclosed Anonymously, "Method to Trigger Credit Card Transactions With the Holder Position", An IP.com Prior Art Database Technical Disclosure, IP.com No. IPCOM000224989D, Jan. 18, 2013, 4 pages.
(Continued)

*Primary Examiner* — Abiy Getachew
(74) *Attorney, Agent, or Firm* — Michael O'Keefe

(57) ABSTRACT

According to one embodiment, a method, computer system, and computer program product for processing a secure data phone request are provided. The embodiment may include identifying a user participating in a voice call by a user voice signature. The embodiment may also include identifying a verbal request, received during the voice call, for the identified user to provide sensitive information. The embodiment may further include identifying, upon authorization of the identified user, a response from a repository of stored, pre-recorded responses associated with the identified user that satisfies the request, where the stored responses are stored as a pre-recorded voice clip or a pre-recorded number sequence on the client computing device.

20 Claims, 7 Drawing Sheets

Related U.S. Application Data continuation of application No. 16/413,956, filed on May 16, 2019, now Pat. No. 11,012,556, which is a continuation of application No. 15/817,538, filed on Nov. 20, 2017, now Pat. No. 11,012,555.

(51) Int. Cl.
  *H04M 3/51* (2006.01)
  *H04W 12/06* (2021.01)

(52) U.S. Cl.
  CPC ...... *H04W 12/06* (2013.01); *H04M 2203/256* (2013.01); *H04M 2203/6009* (2013.01); *H04M 2203/6045* (2013.01)

(58) Field of Classification Search
  CPC ....... H04M 2203/6045; H04L 63/0853; H04L 63/08; H04L 63/102; H04L 63/123; H04W 12/06
  See application file for complete search history.

(56) References Cited

U.S. PATENT DOCUMENTS

| | | | |
|---|---|---|---|
| 6,870,916 | B2 | 3/2005 | Henrikson |
| 7,127,403 | B1 | 10/2006 | Saylor |
| 7,133,838 | B2 | 11/2006 | Tokuma |
| 7,277,122 | B2 | 10/2007 | Sakai |
| 7,478,157 | B2 | 1/2009 | Bohrer |
| 7,505,759 | B1 | 3/2009 | Rahman |
| 7,685,631 | B1 | 3/2010 | Paya |
| 8,181,246 | B2 | 5/2012 | Shulman |
| 8,420,103 | B2 | 4/2013 | Baudin |
| 8,666,378 | B2 | 3/2014 | Spence |
| 8,856,869 | B1 | 10/2014 | Brinskelle |
| 9,092,772 | B2 | 7/2015 | Fernandez |
| 9,413,891 | B2 | 8/2016 | Dwyer |
| 9,922,364 | B1 | 3/2018 | Chen |
| 10,013,983 | B1 * | 7/2018 | Johnson ................ G06V 40/16 |
| 10,200,364 | B1 | 2/2019 | Ketharaju |
| 10,231,128 | B1 * | 3/2019 | Ziraknejad ............ H04W 12/08 |
| 10,909,263 | B2 | 2/2021 | Ogle |
| 10,979,423 | B1 | 4/2021 | Garner, IV |
| 11,010,763 | B1 | 5/2021 | Fillinger |
| 11,012,555 | B2 | 5/2021 | Deluca |
| 11,012,556 | B2 | 5/2021 | Deluca |
| 2002/0019817 | A1 | 2/2002 | Matsui |
| 2002/0029195 | A1 | 3/2002 | Russell |
| 2002/0173295 | A1 | 11/2002 | Petri |
| 2002/0188563 | A1 | 12/2002 | Isaji |
| 2003/0110076 | A1 | 6/2003 | Holt |
| 2004/0215517 | A1 | 10/2004 | Chen |
| 2005/0171917 | A1 | 8/2005 | Femenia |
| 2006/0259950 | A1 | 11/2006 | Mattsson |
| 2007/0143824 | A1 | 6/2007 | Shahbazi |
| 2007/0234417 | A1 | 10/2007 | Blakley, III |
| 2007/0245409 | A1 | 10/2007 | Harris |
| 2008/0196083 | A1 | 8/2008 | Parks |
| 2008/0215509 | A1 | 9/2008 | Charlton |
| 2008/0320567 | A1 | 12/2008 | Shulman |
| 2009/0288136 | A1 | 11/2009 | Chang |
| 2009/0300716 | A1 | 12/2009 | Ahn |
| 2009/0307743 | A1 | 12/2009 | Azagury |
| 2010/0077484 | A1 | 3/2010 | Paretti |
| 2010/0100928 | A1 | 4/2010 | Gasparini |
| 2010/0257577 | A1 | 10/2010 | Grandison |
| 2011/0030067 | A1 | 2/2011 | Wilson |
| 2013/0298247 | A1 | 11/2013 | Laurila |
| 2013/0329867 | A1 | 12/2013 | Hodge |
| 2014/0082749 | A1 | 3/2014 | Holland |
| 2014/0244488 | A1 | 8/2014 | Kim |
| 2014/0289789 | A1 | 9/2014 | Poornachandran |
| 2016/0359828 | A1 | 12/2016 | Thormaehlen |
| 2016/0364729 | A1 | 12/2016 | Ruparelia |
| 2017/0041270 | A1 | 2/2017 | Gubbala |
| 2017/0185802 | A1 | 6/2017 | Barsness |
| 2017/0201524 | A1 | 7/2017 | Dureau |
| 2017/0339740 | A1 | 11/2017 | Abichandani |
| 2018/0027413 | A1 | 1/2018 | Hanley |
| 2018/0068317 | A1 | 3/2018 | Gilbey |
| 2018/0114225 | A1 | 4/2018 | Wang |
| 2018/0152445 | A1 * | 5/2018 | Ye ........................... G10L 17/24 |
| 2019/0026450 | A1 | 1/2019 | Egner |
| 2019/0027137 | A1 | 1/2019 | Sohn |
| 2019/0130286 | A1 | 5/2019 | Salameh |
| 2021/0168236 | A1 | 6/2021 | Deluca |

OTHER PUBLICATIONS

Disclosed Anonymously, "Sharing of Limited Use Credit Authorization Codes on Mobile Devices", An IP.com Prior Art Database Technical Disclosure, IP.com No. IPCOM000244787D, Jan. 15, 2016, 3 pages.

Granville, Vincent, "Credit Card Number and Password Encoder/Decoder", Analyticbridge, Accessed Jan. 5, 2017, 3 pages.

IBM Appendix P, "List of patent and patent applications treated as related", Filed Herewith, 2 pages.

King et al., "Protecting the privacy and security of sensitive customer data in the cloud", Computer Law & Security Review, vol. 28, 2012, 12 Pages.

Maggi et al., "Are the Con Artists Back? A Preliminary Analysis of Modern Phone Frauds", 2010 10th IEEE International Conference on Computer and Information Technology (CIT 2010), Jun. 29-Jul. 1, 2010, University of Bradford, Bradford, United Kingdom, 8 Pages.

Morshedi, Roya, "Security and Privacy for Storage and Computation in Cloud Computing", International Journal of Review in Life Sciences, 5(5), 2015, 17 Pages.

Ribacoff et al., "I, Spy: How to Be Your Own Private Investigator", Publisher: Macmillan Audio; Unabridged Edition, ISBN-10: 1427267839, ISBN-13: 978-1427267832, Feb. 9, 2016, 1 Page, (Abstract Only).

Schluter, HC., "Identikey—identification for access control", Office Management, vol. 30, No. 2, Feb. 1982, 7 pages.

* cited by examiner

NON-VERBAL SENSITIVE DATA AUTHENTICATION

BACKGROUND

The present invention relates, generally, to the field of computing, and more particularly to data transmission.

Data transmission relates to the process of transmitting data from a source to a recipient while ensuring the data received by the recipient is an accurate representation of the data transmitted from the source. Data transmission may also involve the process of securing data prior to transmission through encryption or conversion to packets of data.

SUMMARY

According to one embodiment, a method, computer system, and computer program product for processing a secure data phone request are provided. The embodiment may include identifying a user participating in a voice call by a user voice signature. The embodiment may also include identifying a verbal request, received during the voice call, for the identified user to provide sensitive information. The embodiment may further include identifying, upon authorization of the identified user, a response from a repository of stored, pre-recorded responses associated with the identified user that satisfies the request, where the stored responses are stored as a pre-recorded voice clip or a pre-recorded number sequence on the client computing device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
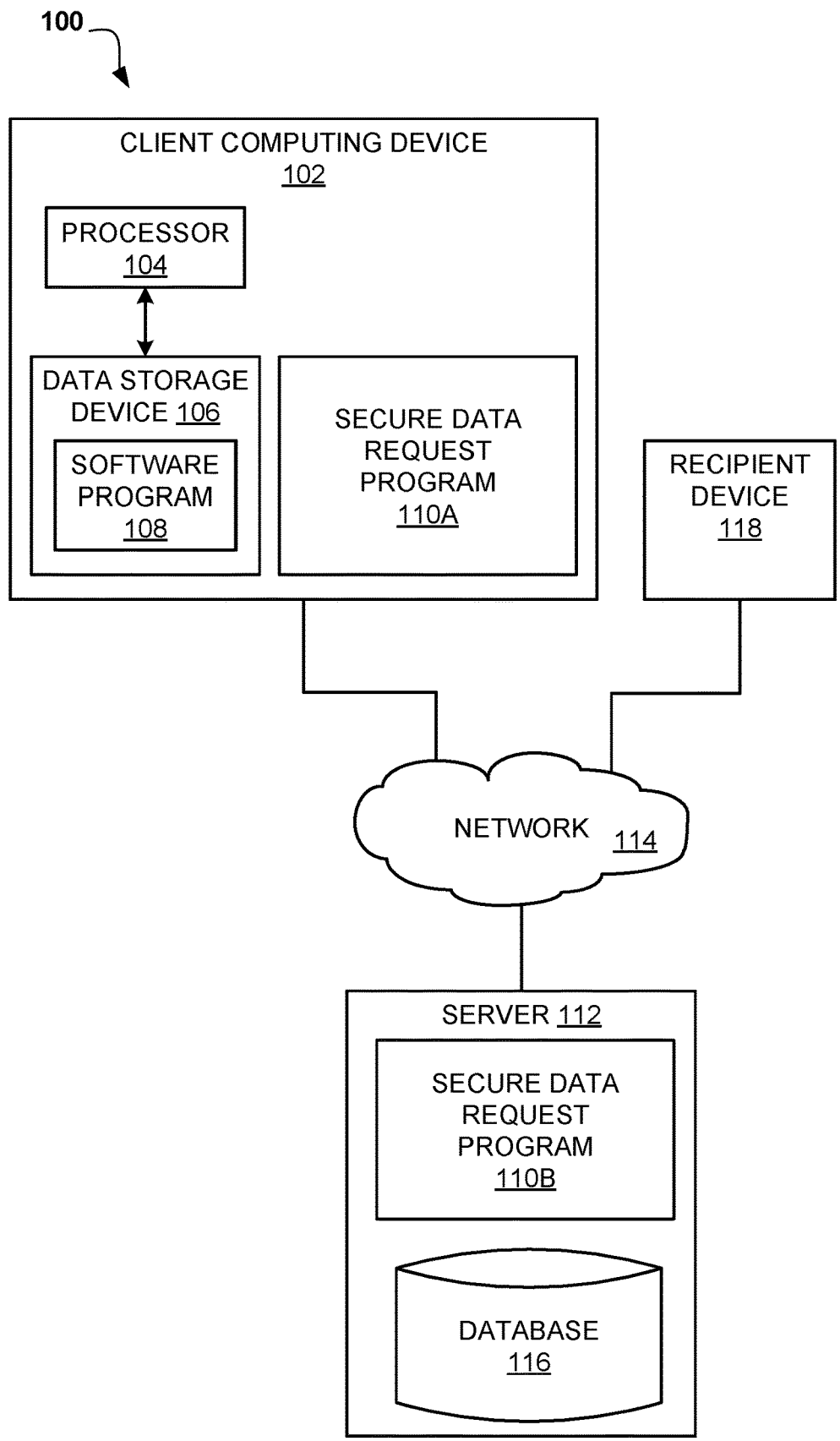
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to data transmission. The following described exemplary embodiments provide a system, method, and program product to, among other things, respond to sensitive data requests non-verbally over a telephone conversation. Therefore, the present embodiment has the capacity to improve the technical field of data transmission by transmitting sensitive data to another individual participating in a telephone conversation that prohibits disclosure of the sensitive information to an eavesdropper.

As previously described, data transmission relates to the process of transmitting data from a source to a recipient while ensuring the data received by the recipient is an accurate representation of the data transmitted from the source. Data may be transmitted using various data transmission languages, such as Resource Description Framework (RDF), Extensible Markup Language (XML), Atom Syndication Format (Atom), JavaScript® Object Notation (JSON) (JavaScript and all JavaScript-based trademarks and logos are trademarks or registered trademarks of Oracle Corporation and/or its affiliates), YAML, Rebol® (Rebol and all Rebol-based trademarks and logos are trademarks or registered trademarks of Rebol Technologies and/or its affiliates), and Gellish. Data transmission may also involve the process of securing data prior to transmission through encryption or conversion to packets of data.

A user engaging in transactions while using a mobile device may be asked to provide sensitive information under a variety of circumstances, such as providing a credit card number when executing a transaction or confirming the user's identity by providing the user's social security number or driver's license number. In an environment where identity theft is prevalent and other individuals may be exposed to a user's disclosure of such information, a user may be apprehensive to provide such information in a public and/or unsecure setting. For example, if an individual is shopping in a store when the individual discovers a credit card company has placed a lock on use of the individual's credit card, the individual may be required to contact the credit card company and provide sensitive information, such as a social security number, before the lock is lifted from the individual's credit card. Since other people or devices capable of capturing sound may be around the individual when the individual is providing the sensitive information, the individual may be at risk of inadvertently disclosing the sensitive information to a third party or entity. As such, it may be advantageous to, among other things, implement a system capable of processing sensitive data requests without requiring a user to speak the sensitive information aloud.

According to one embodiment, user responses in a variety of forms (e.g., verbal, written, or typed) to various sensitive data requests may be stored in a repository, such as a database on a server or a data storage device within a client computing device. When a user receives a request for sensitive information during participation in a telephone conversation, voice recognition technology may identify the request, determine the appropriate response from the stored user responses, and, upon user authorization, transmit the sensitive data to the requesting party thereby bypassing the requirement for the user to verbalize the sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to store user responses to various sensitive information requests and transmit the user responses to a requesting party upon user authorization.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network (e.g., public service telephone network (PSTN)), a wireless network, a public switched network, the internet, and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a secure data request program 110A and communicate with the server 112 and recipient device 118 via the communication network 114, in accordance with one embodiment of the invention. Client computing device 102 and recipient device 118 may each be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a secure data request program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the secure data request program 110A, 110B may be a program capable of receiving responses to various sensitive information requests and storing the received responses in a repository, such as database 116 or data storage device 106. When a request for sensitive information is identified, the secure data request program 110A, 110B may determine what information is being requested and, once user authorization is received, transmit the appropriate response stored in the repository to the requesting party. The secure data request method is explained in further detail below with respect to FIG. 2.

Figure 2:
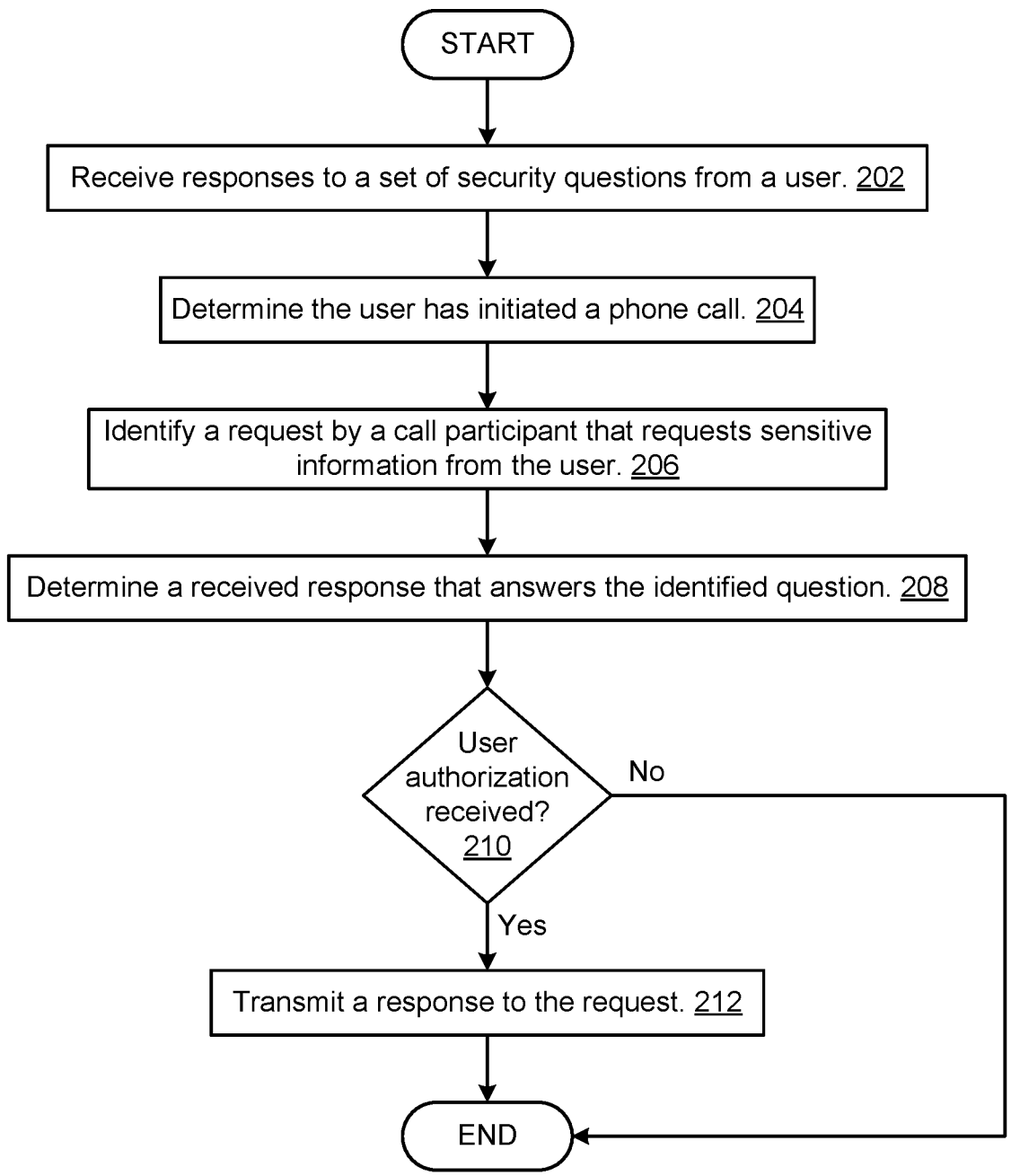
FIG. 2 is an operational flowchart illustrating a secure data request process according to at least one embodiment.

FIG. 2 is an operational flowchart illustrating a secure data request process 200 according to at least one embodiment. At 202, the secure data request program 110A, 110B receives responses to a set of security questions from a user. Prior to an initial use of the secure data request program 110A, 110B, the user may be prompted by the secure data request program 110A, 110B with one or more common security questions to which the user may provide responses. The security questions may require the user to disclose sensitive information, such as social security number, driver's license number, or credit card number. In at least one embodiment, the sensitive information provided through the common security questions to the secure data request program 110A, 110B may be identifying information, such as telephone number, social security number, driver's license number, pin number, birth date, credit card number, address, password, account number, security question answer, nickname, mother's maiden name, name of a child, name of a pet, an educational institution attended, a place of residence, or an item currently or previously owned.

In at least one embodiment, the secure data request program 110A, 110B may store personal data, such as the responses to security questions, in a profile associated with a specific user to enable multiple users being capable of utilizing the secure data request program 110A, 110B on the same device. For example, a pair of spouses may use a single spouse's mobile phone to make a call and the secure data request program 110A, 110B may store a set of security question responses for each spouse on the mobile device.

In at least one embodiment, the secure data request program 110A, 110B may store the user responses in a repository, such as a data storage device 106 or a database 116, on a mobile device, such as client computing device 102, or on a cloud-based system, such as storage on server 112, that may be accessible by a mobile device via network 114. The responses may be stored in various formats, such as a pre-recorded voice clip on the client computing device 102, a pre-recorded number sequence (e.g., a keypad entry, a spoken number or sequence of numbers, etc.) on the client computing device 102, or a pre-recorded voice clip on a cloud-based service. In at least one embodiment, the secure data request program 110A, 110B may prompt the user to determine if the user wishes to store the responses in a database for use in answering subsequent requests for sensitive information after an initial request is provided by the user during a telephone call. For example, if the user is asked to provide a credit card number during a call and the user has not provided the credit card number before, the secure data request program 110A, 110B may not be capable of providing the credit card number at that time since the credit card number may not be stored in database 116. However, at the time of request or at the end of the call, the secure data request program 110A, 110B may prompt the user to select whether the user would like the secure data request program 110A, 110B to save the credit card number in the database 116 for subsequent use when requests for sensitive information are received.

Then, at 204, the secure data request program 110A, 110B determines the user has initiated a phone call. The secure data request program 110A, 110B may monitor user activity on a mobile device until the secure data request program 110A, 110B determines the user has joined or initiated a telephone conversation with another individual. For example, the user may begin a voice call or a video call with a banking enterprise with which the user has an account by interacting with a graphical user interface that displays the bank's contact information. If the user is joining or initiating from a client computing device 102 that is not the user's primary mobile device, such as the user's personal cell phone, the user may connect to the secure data request program 110A, 110B via a cloud-based response service or by dialing directly into the response service.

In at least one embodiment, the secure data request program 110A, 110B may also store identifying information, such as a user voice signature, in the profile so the secure data request program 110A, 110B may be capable of identifying a particular user when necessary. For example, the secure data request program 110A, 110B may utilize voice recognition technology to capture user voice data when a call is initiated to identify the particular user making a call, and identify the set of security question responses stored in a specific user profile on the client computing device 102 that correspond to the identified user. In at least one other embodiment, the secure data request program 110A, 110B may utilize other identification methods, such as fingerprint, passcode, or facial recognition, to identify the user making the call.

Next, at 206, the secure data request program 110A, 110B identifies a request by a call participant that requests sensitive information from the user. During participation in a telephone call, the secure data request program 110A, 110B may identify an instance when a call participant asks the user for sensitive information. The secure data request program 110A, 110B may identify the request for user sensitive information through known voice recognition technology that identifies keywords, such as credit card, social security, etc. For example, if the user is calling a payment service that allows the user to satisfy outstanding bills via telephone, the user may be prompted to speak a 16-digit credit card number. The secure data request program 110A, 110B, utilizing voice recognition technology, may be capable of identifying the request for the user's 16-digit credit card number. In at least one other embodiment, the secure data request program 110A, 110B may allow the user to manually indicate, through user interactions with a graphical user interface on a client computing device 102, that the request for sensitive information has been made.

Then, at 208, the secure data request program 110A, 110B determines a received response that answers the identified question. Once a request for sensitive information has been identified, the secure data request program 110A, 110B may use known natural language processing techniques, such as speech-to-text and semantic analysis, to determine a received response that appropriately addresses the request. For example, if the call participant requested the user's 16-digit credit card number, the secure data request program 110A, 110B may determine the received response the includes the user's 16-digit credit card. In at least one embodiment, the secure data request program 110A, 110B may parse the repository in which the received responses are stored, such as the data storage device 106 or the database 116, to located the appropriate response to the call participant's request. In at least one other embodiment, the secure data request program 110A, 110B may determine more than one response to the call participant's request. For example, if the user has more than one 16-digit credit card number within the set of received responses, the secure data request program 110A, 110B may determine each number answers the identified question.

Next, at 210, the secure data request program 110A, 110B determines whether user authorization has been received to respond to the request for sensitive information. According to one implementation, the secure data request process 200 may continue if user authorization has been received to respond to the request for sensitive information. The secure data request program 110A, 110B may prompt the user, through a graphical user interface of a client computing device 102, to authorize the secure data request program 110A, 110B to respond to the request for sensitive information posed by the identified question. The authorization provided by the user may be a device key combination (e.g., the user enters the characters "#SS" to respond to the request with a social security number or the characters "#CC1" for a first stored credit card number), a recognized voice command (e.g., the user speaks the phrase "share data"), a new menu option on the client computing device 102, or an automatic prompt when a request is determined. If secure data request program 110A, 110B determines user authorization has been received (step 210, "Yes" branch), the secure data request process 200 may continue to step 212 to transmit a response to the request. If the secure data request program 110A, 110B determines the user authorization has not been received (step 210, "No" branch), the secure data request process 200 may terminate.

In at least one embodiment, where the secure data request program 110A, 110B has determined more than one response within the received responses satisfactorily answers the request for sensitive information, the secure data request program 110A, 110B may prompt the user to select which response is the most appropriate to transmit to the requesting call participant. For example, in the previously described example where a call participant requests a user's 16-digit credit card number and the secure data request program 110A, 110B identifies more than one 16-digit credit card number among the received responses, the secure data request program 110A, 110B may provide each response to the user on a graphical user interface and require the user to select the credit card number with which to respond to the request for information.

In at least one other embodiment, the secure data request program 110A, 110B may prompt the user to confirm that the user wishes to transmit the sensitive information once an initial authorization has been received, such as the user entering a password, a passcode, a fingerprint, last four digits of the user's social security number, or other identifying information.

Then, at 212, the secure data request program 110A, 110B transmits a response to the request based on the user authorization. Once authorization is received, the secure data request program 110A, 110B may encrypt and/or convert the data to packets then transmit the response to the request for sensitive information to the requesting individual or device 118 via the network 114 using a network interface card (NIC) without the user being required to speak the sensitive information aloud. For example, if a user has approved the transmission of a credit card number to a requesting individual, the secure data request program 110A, 110B may transmit the credit card number upon appropriate authorization from the user. In at least one embodiment, the response may be in one of a variety of formats, such as a sound clip, a text file, or an image, transmitted to the requesting individual. For example, the secure data request program 110A, 110B may transmit a sound clip file that may be played to the requesting individual upon receipt but does not require the user to speak the sensitive information. In at least one other embodiment, the secure data request program 110A, 110B may transmit the sensitive information in a format that may be displayed on a graphical user interface of a client computing device 102 associated with the requesting individual. For example, the secure data request program 110A, 110B may transmit a credit card number that may be displayed on the receiving individual's mobile device display screen upon receipt for the receiving individual to visually observe. In at least one embodiment, when transmitting the response, the secure data request program 110A, 110B may convert the response to an analog signal before transmitting the response to a requesting entity.

Figure 3:
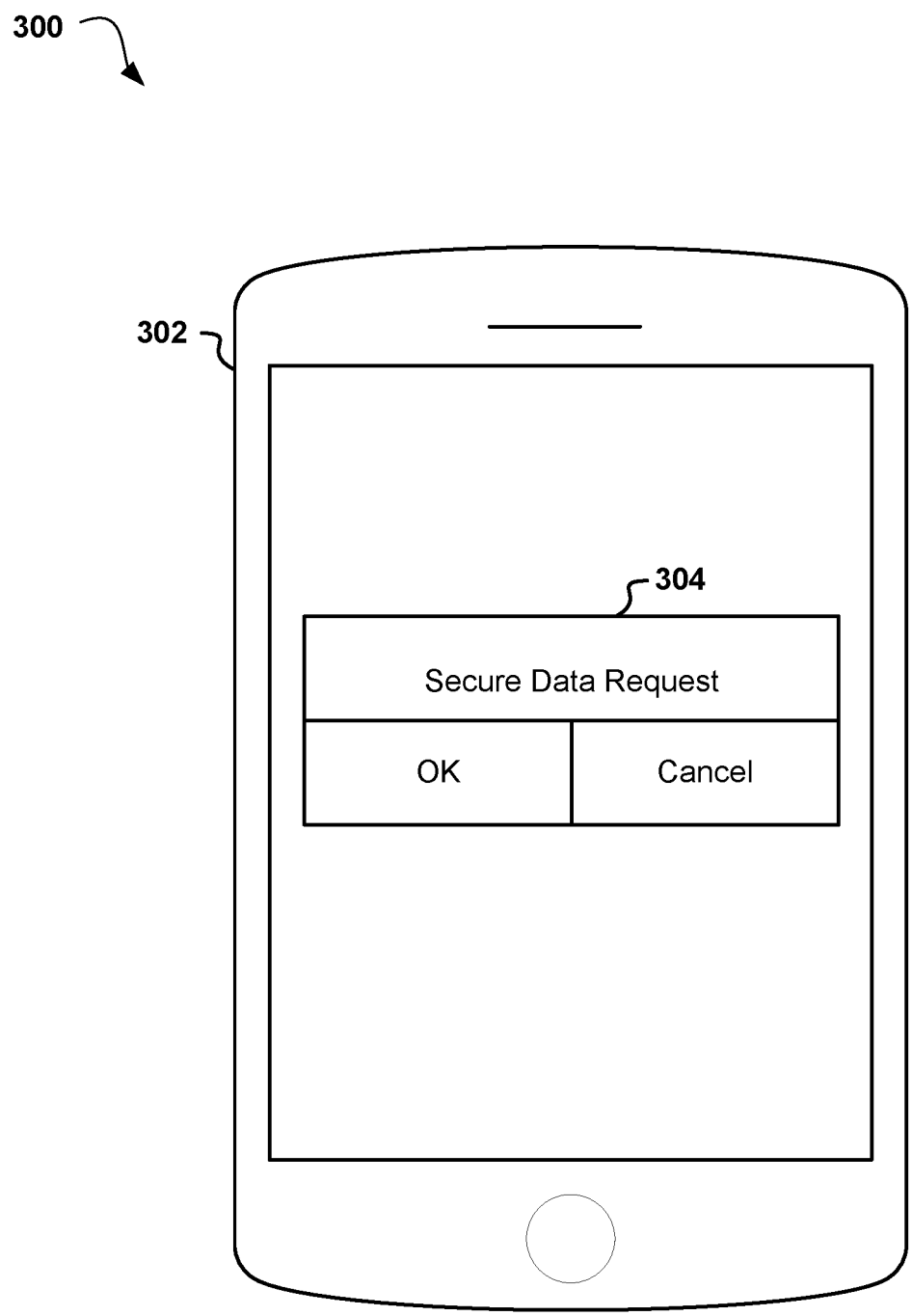
FIG. 3 is a functional block diagram of a secure data request on a mobile device according to at least one embodiment.

Referring now to FIG. 3, a functional block diagram 300 of a secure data request on a mobile device according to at least one embodiment. When the secure data request program 110A, 110B determines that a request for sensitive information has been made by a call participant to the user, the secure data request program 110A, 110B may display a prompt 304 on a graphical user interface of a user mobile device 302, such as client computing device 102. The user may indicate a response to the prompt 304 by interacting with the graphical user interface. In at least one embodiment, the secure data request program 110A, 110B may display in the prompt 304 the specific response that the secure data request program 110A, 110B will provide to the requesting call participant if the user indicates that a response should be transmitted. In at least one other embodiment, the secure data request program 110A, 110B may display in the prompt 304 multiple responses that may appropriately answer the call participant's request. For example, if the call participant asks for the user's credit card information and information for more than one credit card is identified by the secure data request program 110A, 110B, the secure data request program 110A, 110B may display all located credit card information in the prompt 304 and allow the user to interact with the graphical user interface of the mobile device 302 to designate which item is appropriate to include in a response to the requesting call participant.

If the user response to the prompt 304 is to share a response to the sensitive information request, the secure data request program 110A, 110B may transmit the appropriate response to the requesting call participant. If the user response to the prompt 304 is to not share a response to the sensitive information request, the secure data request program 110A, 110B may terminate and not transmit a response to the requesting call participant.

It may be appreciated that FIGS. 2 and 3 provide only an illustration of one implementation and do not imply any limitations with regard to how different embodiments may be implemented. Many modifications to the depicted environments may be made based on design and implementation requirements. In at least one embodiment, the secure data request program 110A, 110B may monitor user calls for sensitive information disclosures and, upon completion of a call, prompt the user to indicate whether any sensitive information disclosed during the conversation should be recorded in a repository for subsequent use by secure data request program 110A, 110B. For example, if a user is speaking in a telephone conversation with a family member and the secure data request program 110A, 110B determines the user recites a 16-digit credit card number during the conversation, secure data request program 110A, 110B may determine the 16-digit credit card number is sensitive information that the user may wish to store for subsequent use by the secure data request program 110A, 110B. Therefore, the secure data request program 110A, 110B may display a prompt on a graphical user interface of a user client computing device 102 asking the user if the 16-digit credit card number spoken during the preceding conversation should be stored by the secure data request program 110A, 110B. If the user indicates, through user interactions with the graphical user interface, that the 16-digit credit card number should be stored, the secure data request program 110A, 110B may store the 16-digit credit card number as a voice clip recording from the preceding call.

Figure 4:
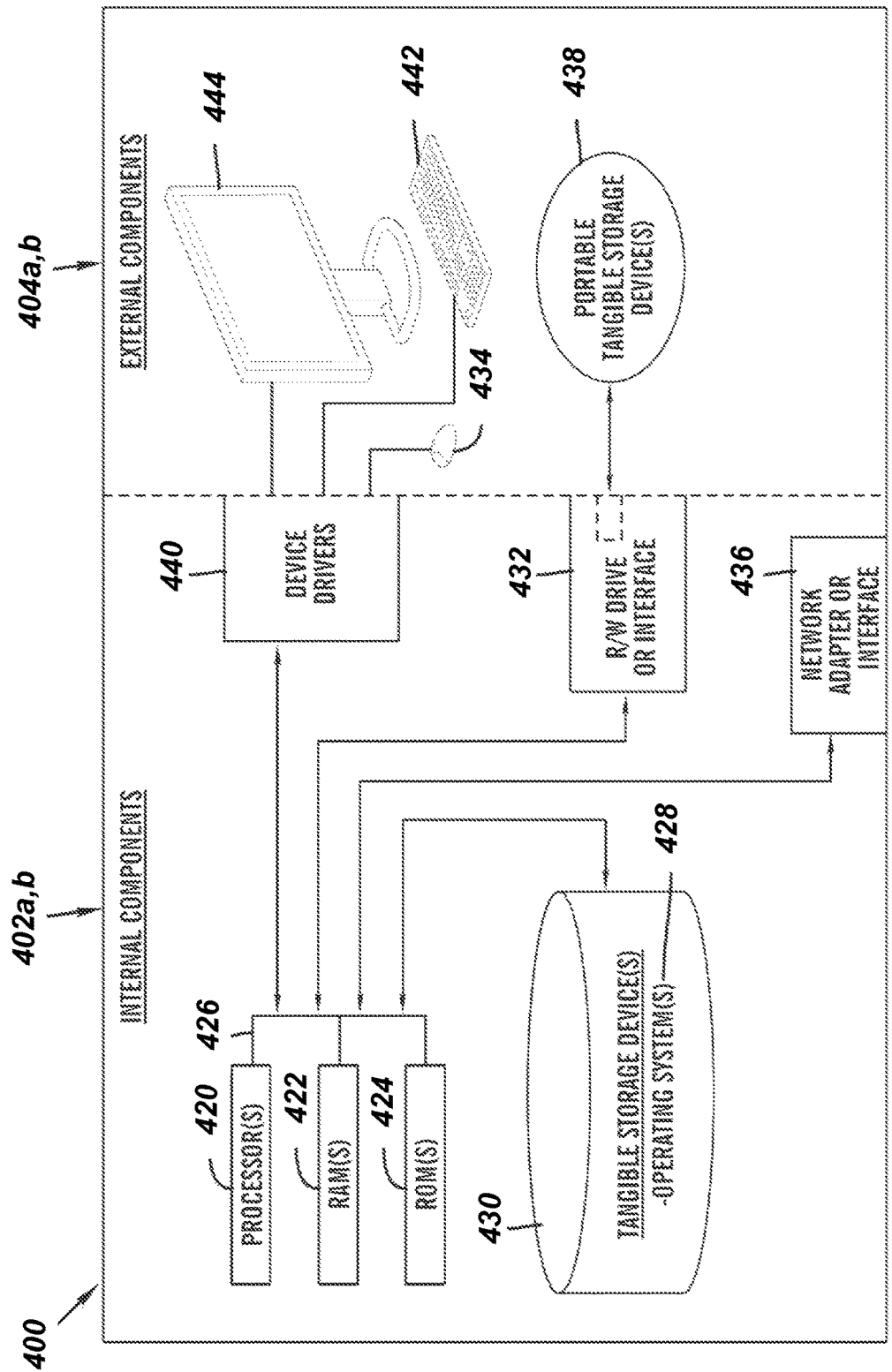
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the secure data request program 110A in the client computing device 102 and the secure data request program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the secure data request program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the secure data request program 110A in the client computing device 102 and the secure data request program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the secure data request program 110A in the client computing device 102 and the secure data request program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 5:
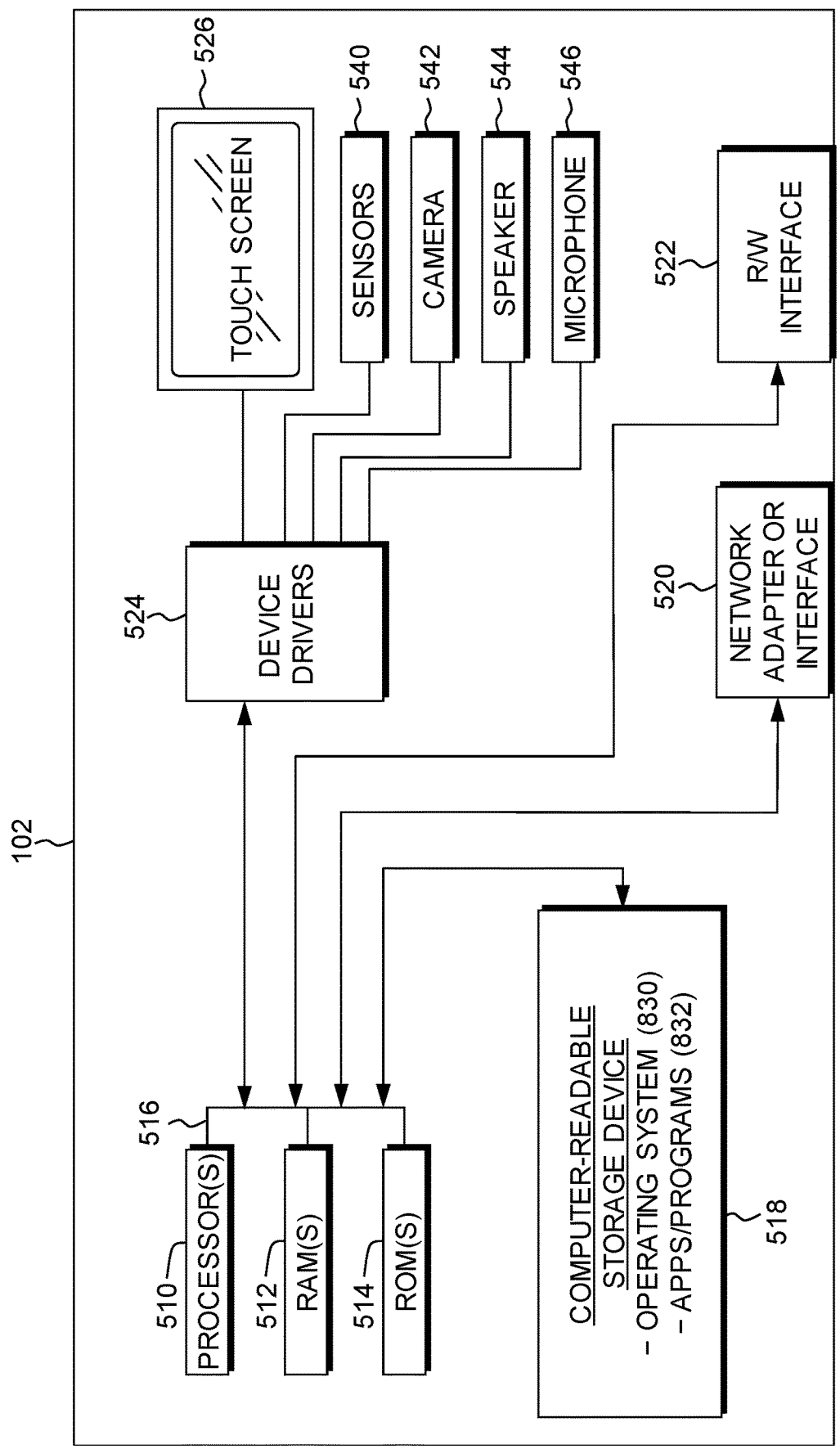
FIG. 5 is a block diagram of components of a computing device, in accordance with an embodiment of the present invention.

FIG. 5 is a block diagram of components of a computing device 102, in accordance with an embodiment of the present invention. In an exemplary embodiment, computing device 102 includes one or more processors 510, one or more computer-readable RAMs 512, one or more computer-readable ROMs 514, and one or more computer-readable storage devices 518 on one or more buses 516. One or more operating systems 530, and one or more apps or programs 532 are stored on the one or more computer-readable tangible storage devices 518 for execution by one or more of the processors 510 via one or more of the RAMs 512 (which typically include cache memory). In the illustrated embodiment, each of the computer-readable tangible storage devices 518 is a semiconductor storage device such as ROM 514, EPROM, flash memory or any other computer-readable tangible storage device that can store a computer program and digital information. Alternatively, each of the computer-readable tangible storage devices 518 is a magnetic disk storage device of an internal hard drive.

Computing device 102 also includes a read/write (R/W) interface 522, for example, a USB port, to read from and write to external computing devices or one or more portable computer-readable storage devices such as a CD-ROM, DVD, memory stick, magnetic disk, optical disk or semiconductor storage device. The apps and programs 532 can be stored on the external computing devices or one or more of the portable computer-readable tangible storage devices, read via the R/W interface 522 and loaded onto the computer-readable tangible storage device 518.

Computing device 102 also includes a network adapter or interface 520, such as a TCP/IP adapter card or wireless communication adapter (such as a 4G wireless communication adapter using OFDMA technology). The apps and programs 532 can be downloaded to computing device 102 from an external computer or external storage device via a network (for example, the Internet, a local area network, a wide area network, or a wireless network) and network adapter or interface 520. From the network adapter or interface 520, the apps and programs 532 are loaded into computer-readable tangible storage device 518. The network may comprise copper wires, optical fibers, wireless transmission, routers, firewalls, switches, gateway computers and/or edge servers.

Computing device 102 also includes a touch screen 526, sensors 540, for example, touch screen sensors and magnetically sensitive circuits, and device drivers 524 to interface to touch screen 526 for imaging, to sensors 540 for pressure sensing of alphanumeric character entry and user selections and for detecting magnetic flux and polarity. Computing device 102 also includes a camera 542, a speaker 544, and a microphone 546. The device drivers 524, R/W interface 522 and network adapter or interface 520 comprise hardware and software (stored in computer-readable tangible storage device 518 and/or ROM 514).

It should be appreciated that FIG. 5 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
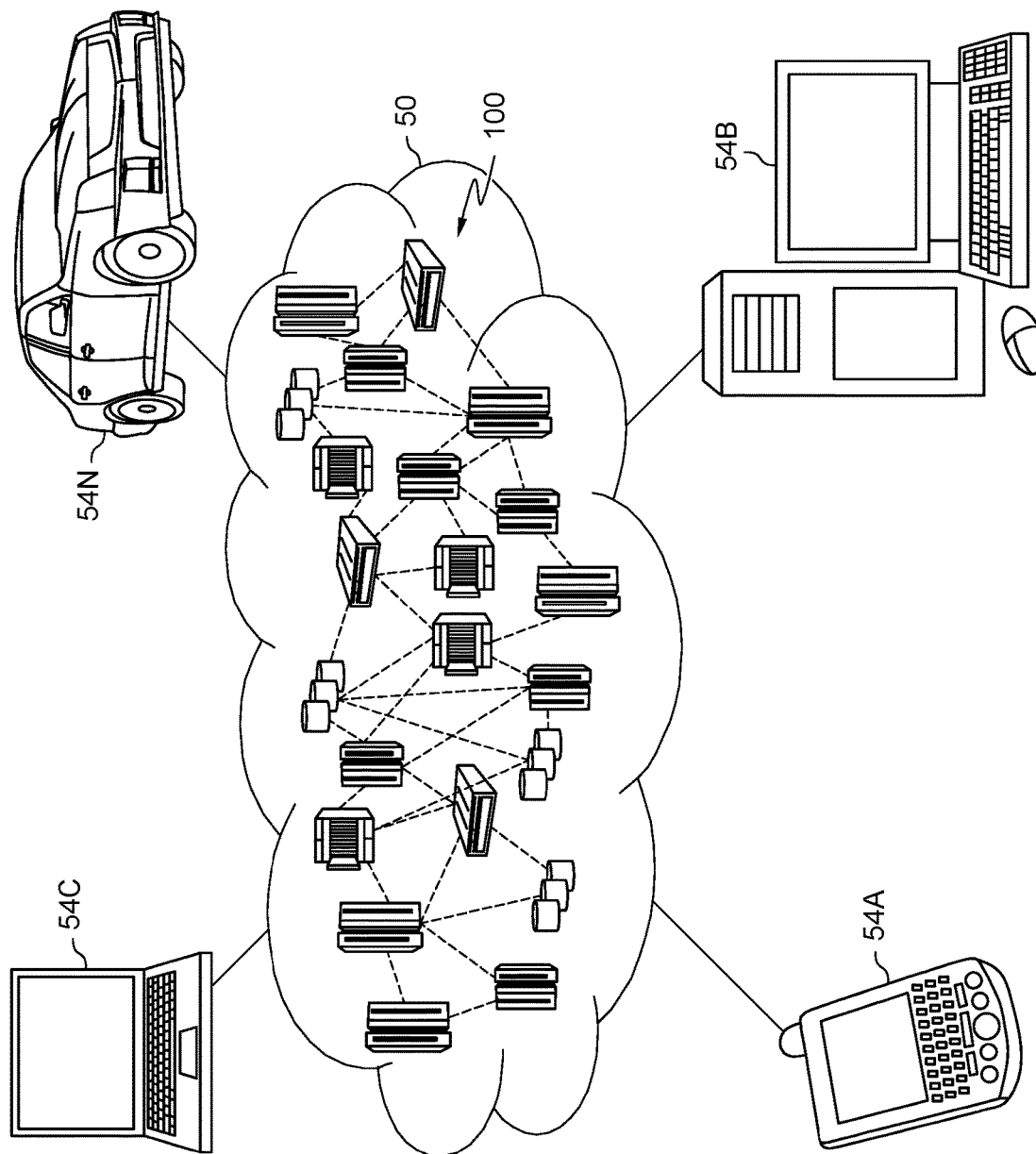
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
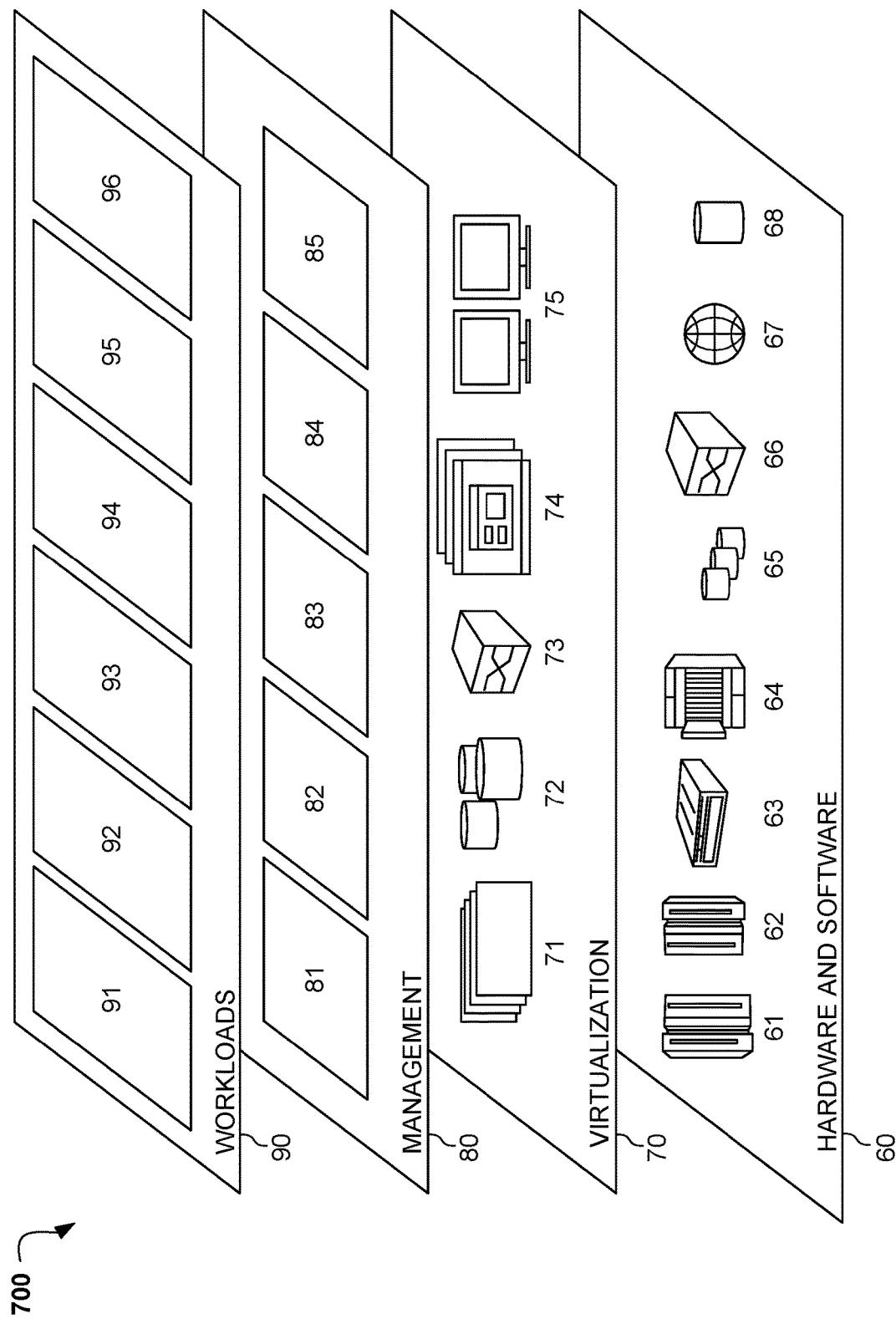
FIG. 7 depicts abstraction model layers according to an embodiment of the present invention.

Referring now to FIG. 7, a set of functional abstraction layers 600 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing secure data requests 96. Processing secure data requests 96 may relate receiving and storing user responses to sensitive information requests and, when sensitive information is requested during a phone call by a third party, identifying the stored user response that satisfies the inquiry so a transmission may be sent to the requesting party without requiring a user to verbalize a response that may contain the sensitive information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
identifying a user participating in a voice call by a user voice signature;
identifying a verbal request, received during the voice call, for the identified user to provide sensitive information; and
identifying, upon authorization of the identified user, a response from a repository of stored, pre-recorded responses associated with the identified user that satisfies the request, wherein the stored responses are stored as a pre-recorded voice clip or a pre-recorded number sequence on the client computing device.

2. The method of claim 1, further comprises:
determining a user has authorized the identified response be transmitted to a call participant.

3. The method of claim 2, wherein determining the user has authorized the identified response be transmitted to the call participant further comprises:
receiving an authorization from the user, through a graphical user interface, to transmit the identified response.

4. The method of claim 3, wherein receiving the authorization further comprises:
displaying, in the graphical user interface, two or more responses within the stored responses that satisfy the identified request; and
receiving a selection of a response of the two or more displayed responses.

5. The method of claim 1, wherein the user voice signature is stored in a user profile on the client computing device or in a cloud-based repository.

6. The method of claim 1, wherein the sensitive information comprises personal identifying information, and wherein the personal identifying information is selected from a group consisting of a telephone number, a social security number, a driver's license number, a pin, a birth date, a credit card number, an address, a password, an account number, a security question answer, a nickname, a mother's maiden name, a child name, a pet name, an educational institution attended, a place of residence, a currently owned item, or a previously owned item.

7. The method of claim 6, further comprising:
in response to a user answering a request for sensitive information a first time, prompting the user to save a user answer to the request for sensitive information as a pre-recorded answer.

8. A computer system for processing a secure data request via a mobile device, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
identifying a user participating in a voice call by a user voice signature;
identifying a verbal request, received during the voice call, for the identified user to provide sensitive information; and
identifying, upon authorization of the identified user, a response from a repository of stored, pre-recorded responses associated with the identified user that satisfies the request, wherein the stored responses are stored as a pre-recorded voice clip or a pre-recorded number sequence on the client computing device.

9. The computer system of claim 8, further comprises:
determining a user has authorized the identified response be transmitted to a call participant.

10. The computer system of claim 9, wherein determining the user has authorized the identified response be transmitted to the call participant further comprises:
receiving an authorization from the user, through a graphical user interface, to transmit the identified response.

11. The computer system of claim 10, wherein receiving the authorization further comprises:
displaying, in the graphical user interface, two or more responses within the stored responses that satisfy the identified request; and
receiving a selection of a response of the two or more displayed responses.

12. The computer system of claim 8, wherein the user voice signature is stored in a user profile on the client computing device or in a cloud-based repository.

13. The computer system of claim 8, wherein the sensitive information comprises personal identifying information, and wherein the personal identifying information is selected from a group consisting of a telephone number, a social security number, a driver's license number, a pin, a birth date, a credit card number, an address, a password, an account number, a security question answer, a nickname, a mother's maiden name, a child name, a pet name, an educational institution attended, a place of residence, a currently owned item, or a previously owned item.

14. The computer system of claim 13, further comprising:
in response to a user answering a request for sensitive information a first time, prompting the user to save a user answer to the request for sensitive information as a pre-recorded answer.

15. A computer program product for processing a secure data request via a mobile device, the computer program product comprising:
one or more computer-readable tangible storage media and program instructions stored on at least one of the one or more tangible storage media, the program instructions executable by a processor of a computer to perform a method, the method comprising:
identifying a user participating in a voice call by a user voice signature;
identifying a verbal request, received during the voice call, for the identified user to provide sensitive information; and identifying, upon authorization of the identified user, a response from a repository of stored, pre-recorded responses associated with the identified user that satisfies the request, wherein the stored responses are stored as a pre-recorded voice clip or a pre-recorded number sequence on the client computing device.

16. The computer program product of claim 15, further comprises:

determining a user has authorized the identified response be transmitted to a call participant.

17. The computer program product of claim 16, wherein determining the user has authorized the identified response be transmitted to the call participant further comprises:

receiving an authorization from the user, through a graphical user interface, to transmit the identified response.

18. The computer program product of claim 17, wherein receiving the authorization further comprises:

displaying, in the graphical user interface, two or more responses within the stored responses that satisfy the identified request; and receiving a selection of a response of the two or more displayed responses.

19. The computer program product of claim 15, wherein the user voice signature is stored in a user profile on the client computing device or in a cloud-based repository.

20. The computer program product of claim 15, wherein the sensitive information comprises personal identifying information, and wherein the personal identifying information is selected from a group consisting of a telephone number, a social security number, a driver's license number, a pin, a birth date, a credit card number, an address, a password, an account number, a security question answer, a nickname, a mother's maiden name, a child name, a pet name, an educational institution attended, a place of residence, a currently owned item, or a previously owned item.

* * * * *